(12) United States Patent
McEuen et al.

(10) Patent No.: US 6,414,060 B1
(45) Date of Patent: Jul. 2, 2002

(54) FLAME RETARDANT POLYCARBONATE-ABS POLYMER COMPOSITIONS

(75) Inventors: John M. McEuen, Baton Rouge, LA (US); Mark W. Beltz, Warren, RI (US); Govindarajulu Kumar, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/348,880

(22) Filed: Jul. 7, 1999

(51) Int. Cl.[7] .............................. C08K 5/49; C08K 5/51
(52) U.S. Cl. .................................... 524/136; 524/121
(58) Field of Search ..................... 544/337; 558/157; 524/100, 121, 136

(56) References Cited

U.S. PATENT DOCUMENTS

| | | | | |
|---|---|---|---|---|
| 2,382,622 A | | 8/1945 | Toy .............................. 260/461 |
| 2,944,075 A | * | 7/1960 | Debo .......................... 558/187 |
| 2,971,929 A | * | 2/1961 | Glade .......................... 524/136 |
| 3,497,469 A | * | 2/1970 | Blair ........................... 524/136 |
| 3,932,865 A | * | 1/1976 | Batorewicz ................. 558/187 |
| 3,937,765 A | * | 2/1976 | Toy et al. .................... 558/157 |
| 4,048,264 A | * | 9/1977 | Redmore .................... 558/157 |
| 4,062,909 A | | 12/1977 | Morgan et al. ............. 260/928 |
| 4,086,302 A | | 4/1978 | Morgan et al. ............. 260/926 |
| 4,130,540 A | | 12/1978 | Valdiserri et al. ....... 260/45.8 R |
| 4,134,877 A | | 1/1979 | Morgan et al. ...... 260/45.9 NP |
| 4,144,394 A | | 3/1979 | Morgan et al. ................ 544/84 |
| 4,388,431 A | | 6/1983 | Mauric et al. .............. 524/119 |
| 4,415,692 A | | 11/1983 | Idel et al. .................... 524/183 |
| 4,458,045 A | | 7/1984 | Mauric et al. .............. 524/119 |
| 4,910,240 A | | 3/1990 | Weil et al. .................. 524/125 |
| 5,393,835 A | | 2/1995 | Eckel et al. ................... 525/67 |
| 5,409,976 A | * | 4/1995 | Lindsay ...................... 524/100 |
| 5,416,161 A | | 5/1995 | Nielinger et al. ............. 525/67 |
| 5,723,526 A | | 3/1998 | Nagasawa ................... 524/451 |
| 5,750,602 A | | 5/1998 | Kohler et al. ............... 524/127 |
| 5,811,470 A | * | 9/1998 | Prindle ....................... 524/137 |
| 5,973,041 A | * | 10/1999 | Campbell et al. ........... 524/117 |
| 6,166,115 A | * | 12/2000 | Landa ......................... 524/115 |
| 6,174,942 B1 | * | 1/2001 | Bastiaens et al. ........... 524/100 |

FOREIGN PATENT DOCUMENTS

| | | |
|---|---|---|
| DE | 1084716 | 7/1960 |
| DE | 146957 | 3/1981 |
| EP | 0810242 | 12/1997 |
| GB | 1253226 | 11/1971 |
| JP | 4972346 | 7/1974 |
| JP | 10-175985 | * 6/1998 |
| WO | 9611977 | 4/1996 |

OTHER PUBLICATIONS

Weil, Edward D., "Recent Advances In Phosphorus–Containing Polymers For Flame Retardant Applications", Proceedings of the International Conference On Fire Safety, 1987, vol. 12, pp. 210–218.
Caplus Abstract of EPO Patent 444647, 1991.
CAPLUS Abstract of USSR Patent 990772, 1983.
WPIDS Abstract of USSR Patent 990772, 1983.
CAPLUS Abstract of JP Patent 54019919, 1979.
WPIDS Abstract of JP Patent 54019919, 1979.
CAPLUS Abstract of GB Patent 1484128, 1977.
WPIDS Abstract of GB Patent 1484128, 1977.
CAPLUS Abstract of JP Patent 50013335, 1975.
WPIDS Abstract of JP Patent 50013335, 1975.

* cited by examiner

*Primary Examiner*—Veronica P. Hoke
(74) *Attorney, Agent, or Firm*—E. E. Spielman, Jr.

(57) ABSTRACT

Thermoplastic polycarbonate-ABS resin is rendered flame retardant by blending with the resin an O,O-diaryl-N-arylphosphoramidate, an arylene-N,N'-bis(O,O-diarylphosphoramidate) in which the nitrogen atoms are in the 1,3 or 1,4 positions on an arylene ring, or an N,N'-piperazinediylbis(O,O-diarylphosphoramidate). These flame retardants are halogen-free. They provide molded objects having high heat distortion temperatures, and high softening temperatures. Flame retardants of these types have been found to be thermally stable at temperatures of at least 260° C., and they did not discolor the polymer composition during exposure to molding temperatures.

42 Claims, No Drawings

FLAME RETARDANT POLYCARBONATE-ABS POLYMER COMPOSITIONS

BACKGROUND

Thermoplastic polymer compositions or alloys made by blending together polycarbonate polymer and ABS polymer (PC/ABS) are materials of industrial importance. In order to flame retard such compositions, a number of stringent requirements must be satisfied. Besides being halogen-free and suitably effect in retarding flame, the flame retardant should have a high heat distortion temperature, and a high softening temperature. Thus, even in the absence of an anti-dripping agent such as a Teflon® polymer, the flame retardant should exhibit at least a V-2 rating when test samples are subjected to the UL-94 test procedure. The flame retardant itself should be thermally stable at temperatures of at least about 260° C. and preferably above 260° C., and should not contribute materially to discoloration of the finished polymer composition, especially during exposure to molding or extrusion temperatures. In addition, the flame retardant should not be prohibitively expensive to produce.

In an attempt to provide flame retardants satisfying these requirements, many different phosphorus additives were synthesized and evaluated. Many of the samples failed to meet the thermal stability requirement or decomposed on processing with the PC/ABS.

SUMMARY OF THE INVENTION

Pursuant to this invention certain halogen-free phosphoramidate compounds have been found to satisfy the foregoing requirements. The phosphoramidates used pursuant to this invention are of three types, namely, (I) O,O-diaryl-N-arylphosphoramidates, (II) arylene-N,N'-bis(O,O-diarylphosphoramidates) in which the nitrogen atoms are in the 1,3 or 1,4 positions on an arylene ring, and (III) N,N'-piperazinediylbis(O,O-diarylphosphoramidates).

Thus this invention provides in one of its embodiments a flame retardant polymer composition which comprises a blend made from (i) a polycarbonate-ABS polymer composition, and a flame retardant amount of (ii) at least one halogen-free phosphoramidate selected from (I) O,O-diaryl-N-arylphosphoramidates, (II) arylene-N,N'-bis(O,O-diarylphosphoramidates) in which the nitrogen atoms are in the 1,3 or 1,4 positions on an arylene ring, and (III) N,N'-piperazinediylbis(O,O-diarylphosphoramidates).

Another embodiment is the method of rendering a PC/ABS polymer composition flame retardant which comprises blending with such composition a flame retardant amount of at least one halogen-free phosphoramidate flame retardant selected from (I) O,O-diaryl-N-arylphosphoramidates, (II) arylene-N,N'-bis(O,O-diarylphosphoramidates) in which the nitrogen atoms are in the 1,3 or 1,4 positions on an arylene ring, and (III) N,N'-piperazinediylbis(O,O-diarylphosphoramidates).

The above phosphoramidates can be depicted by the following formulas:

(RO)$_2$P(O)(NHR)     (I)

[(RO)$_2$P(O)NH—]$_2$Ar     (II)

[(RO)$_2$P(O)—]$_2$Z     (III)

where each R is the same or different and is an aryl group, Ar is an arylene group that is bonded in its 1,3- or 1,4- positions to the respective depicted nitrogen atoms, and Z is the piperazinediyl group. Each R group typically contains in the range of 6 to about 18 carbon atoms, examples of which include phenyl, tolyl, ethylphenyl, xylyl, mesityl, biphenylyl, naphthyl, methylnaphthyl, 4-dimethylaminophenyl, and 4-methoxyphenyl. Preferably each R is a hydrocarbyl aryl group (i.e., it consists of carbon and hydrogen atoms), and preferably each R is a monocyclic aryl group having in the range of 6 to 14, and more preferably in the range of 6 to 10 carbon atoms. Most preferably each R group is phenyl.

The flame retardants of this invention are effective in the absence of flame retardant auxiliaries such as (1) antimony-based synergists, (2) halogen-containing flame retardants, and (3) sulfur or sulfur-containing flame retardant auxiliaries. Indeed, it is preferred to use the phosphoramidates of this invention in the absence of any of these three types of flame retardant auxiliary additives.

In one of its embodiments this invention a flame retardant polymer composition which comprises a blend made from PC/ABS, and a flame retardant amount in the range of about 5 to about 30 wt % (preferably in the range of about 10 to about 20 wt %) of at least one halogen-free phosphoramidate described above. Unless otherwise specified, all weight percentages of phosphoramidate given in this document are based on the total weight of the substrate polymer plus phosphoramidate.

In another embodiment, the above PC/ABS substrate polymer and phosphoramidate flame retardant are in the form of a powder blend or master batch wherein the composition contains a higher concentration of the phosphoramidate than the particular concentration to be used in the finished polymer composition. Thus such powder blend or master batch can contain up to about 99 wt % of the phosphoramidate, but normally will contain in the range of about 20 to about 60 wt % phosphoramidate. Such compositions are mixed with additional substrate polymer when producing the molded or extruded article or shape.

In connection with blends that are or are to be molded or extruded (i.e., expressed through a die) without further dilution with substrate polymer, the term "flame retardant amount" as used herein, including the claims hereof, means that the amount of phosphoramidate used in forming the composition is at least the minimum amount in the range of about 5 to about 30 wt % needed with the particular substrate polymer with which the phosphoramidate is blended to enable molded test specimens made from the resultant blend to exhibit at least a V-2 rating in the UL-94 test procedure. More than such minimum amount of phosphoramidate relative to the amount of polymer can be used in these situations and be considered a flame retardant amount, provided that the weight ratio of phosphoramidate to polymer is in the range of about 5 to about 30 wt %. On the other hand, in connection with master batch blends or powder preblends that are prepared for future dilution with additional substrate polymer preparatory to making finished molded, extruded or foamed shapes or objects (articles), any amount of phosphoramidate that is above the minimum "flame retardant amount" can be used.

Other embodiments of the invention will be still further apparent from the ensuing description and the appended claims.

FURTHER DETAILED DESCRIPTION

The phosphoramidates used in the practice of this invention are composed of three groups. One group is composed of O,O-diaryl-N-arylphosphoramidates, compounds of the above formula (I).

The second and third groups are depicted by formulas (II) and (III), respectively. While the aryl groups of all three such groups are most preferably unsubstituted phenyl groups, one or more of them can be substituted with up to 5 hydrocarbyl substituents, e.g., alkyl, alkenyl, cycloalkyl, cycloalkenyl, cycloalkylalkyl, aryl, aralkyl, or one or more non-halogen containing functional substituents such as alkoxy, dialkylamino, nitro, cyano, carboxylic, esterified carboxylic, or like innocuous substituent, or a combination of hydrocarbyl and such functional substituent(s). A few non-limiting examples of formula (I) phosphoramidates include ditolyl-N-phenylphosphoramidate, ditolyl-N-tolylphosphoramidate, diphenyl-N-xylylphosphoramidate, di(ethylphenyl)-N-(p-propylphenyl)phosphoramidate, diphenyl-N-(2,4,6-trimethylphenyl)phosphoramidate, diphenyl-N-(m-nitrophenyl)phosphoramidate, and diphenyl-N-(p-biphenylyl)phosphoramidate. Of the formula (I) phosphoramidates, diphenyl-N-phenylphosphoramidate is most preferred.

The arylene group of the Group II phosphoramidates can be a phenylene, naphthalene, dihydronaphthalene, or tetrahydronaphthalene group in which the univalent bonds to the respective nitrogen atoms are in the 1,3- or 1,4-positions of the phenylene group of such arylene groups. The arylene group can be unsubstituted or substituted with hydrocarbyl substituents, e.g., alkyl, alkenyl, cycloalkyl, cycloalkenyl, cycloalkylalkyl, aryl, aralkyl, and/or one or more nonhalogen containing functional substituents such as alkoxy, dialkylamino, nitro, cyano, carboxylic, esterified carboxylic, or like innocuous substituent(s). In any case, the arylene group will typically contain in the range of 6 to about 18 carbon atoms, and preferably in the range of 6 to about 12 carbon atoms. More preferably the arylene group is 1,4-phenylene, and most preferably it is 1,3-phenylene. A few non-limiting examples of formula (II) phosphoramidates include 1,4-phenylene-N,N'-bis(O,O-diphenylphosphoramidate), 1,3-phenylene-N,N'-bis(O,O-ditolylphosphoramidate), 1,4-phenylene-N,N'-bis(O,O-di-p-tert-butylphenylphosphoramidate), 1,3 -phenylene-N,N'-bis (O,O-di-p-anisylphosphoramidate), 1,4-phenylene-N,N'-bis (O,O-dimesitylphosphoramidate), and 1,4-naphthalene-N, N'-bis(O,O-diphenylphosphoramidate). Of the formula (II) phosphoramidates, 1,3-phenylene-N,N'-bis(O,O-diphenylphosphoramidate) is most preferred.

A few non-limiting examples of N,N'-piperazinediylbis (O,O-diarylphosphoramidates) of formula (III) include such compounds as N,N'-piperazinediylbis(O,O-ditolylphosphoramidate), N,N'-piperazinediylbis(O,O-dixylylphosphoramidate), N,N'-piperazinediylbis(O,O-dimesitylphosphoramidate), N,N'-piperazinediylbis[O,O-di (ethylphenyl)phosphoramidate], and N,N'-piperazinediylbis (O,O-di-p-anisylphosphoramidate). N,N'-piperazinediylbis (O,O-diphenylphosphoramidate) is the most preferred phosphoramidate of formula (III).

Methods which can be used or adapted for use in preparing such compounds are known and reported in the literature. Especially desirable processes for the synthesis of the phosphoramidates used in the practice of this invention are illustrated in the Examples hereinafter.

As is known in the art, PC/ABS polymers are typically comprised of from about 50 to about 90 wt % of a polycarbonate resin and from about 10 to about 50 wt % of an acrylonitrile-butadiene-styrene (ABS) copolymer. Small amounts (e.g., up to about 10 wt %) of additional comonomer, such as methyl methacrylate, ethylacrylate, alpha-methylstyrene, vinyltoluene, acrylonitrile, or the like, may be included in the manufacture of some types of ABS. Details concerning PC/ABS blends, their preparation, and their uses can be found in the literature. See for example, R. Greco and A. Sorrentino, *Adv. Polym. Technol.*, 1994, 13(4), 249–258, and references cited therein, and D. W. Jin, K. H. Shon, H. M. Jeong and B. K. Kim, *J. Appl. Polym. Sci.*, 1998, 69(3), 533–542, which journal articles and cited references are incorporated herein by reference as if fully set forth herein.

The polymer compositions of this invention can be in the form of the molded or extruded shape or object itself. Also, the polymer compositions of this invention can be in the form of a masterbatch or concentrated preblend in which the concentration of the flame retardant components therein is higher than the intended concentration in the ultimate finished molded shape or object to be fabricated. Such masterbatch or concentrated preblend is mixed or blended with additional polymer either as dry materials or as a melt blend which is then molded or extruded to produce the finished shape or object.

The flame retarded PC/ABS polymer compositions can constitute finished polymer compositions containing a flame retardant amount of the flame retardants of this invention in the range of about 5 to about 30 weight percent, although it is more desirable in most cases that this upper amount be about 25 weight percent (so that the composition contains a flame retardant amount in the range of about 5 to about 25 weight percent), and even more desirable in most cases that this upper amount be about 20 weight percent (so that the composition contains a flame retardant amount in the range of about 5 to about 20 weight percent). Such weight percentages are based on the weight of the PC/ABS polymer plus the weight of the phosphoramidate flame retardant(s) used therein pursuant to this invention. The weight of other components, if any, used in forming the finished polymer composition is excluded from such calculation. As noted above, one way of forming such polymer compositions is by use of masterbatch or additive-rich preblend compositions made from the PC/ABS substrate polymer and a higher percentage of the phosphoramidate flame retardant(s) of this invention than the percentage to be included in the ultimate finished product. Such masterbatches or additive-rich preblend compositions will typically be a melt blended masterbatch or a powder preblend made from about 25 to about 95 parts by weight of the phosphoramidate flame retardant(s) per hundred parts by weight of such flame retardant(s) plus the substrate PC/ABS polymer. Such masterbatch and additive-rich preblend compositions, which constitute additional embodiments of this invention, can subsequently be used in forming finished polymer compositions by blending an appropriate amount of the masterbatch or additive-rich preblend with an appropriate amount of the PC/ABS polymer which does not contain the phosphoramidate flame retardant component to thereby produce a blend having the desired end use proportions of the phosphoramidate flame retardant component(s) in whatever form they exist after being blended together.

Typically, and preferably, no halogen-containing additive component is intentionally added to the compositions of this invention. Consequently, the preferred compositions of this invention do not contain halogen except for impurities which may occur therein as a consequence of the materials (solvents, catalysts, etc.), process or process equipment used in their synthesis or manufacture. Typically the additive compositions, e.g., a masterbatch or preblend of the flame retardant components, which can be used in accordance with this invention to prepare the finished polymer compositions of this invention, will contain, if any, no more than about 1000 parts by weight of halogen impurities per million parts by weight (ppmw) of additive composition, and thus the term "halogen-free" in connection with such additive compositions means that they contain, if any, no more than about 1000 ppmw of halogen. The finished polymer compositions of this invention will typically contain, if any, no more than about 100 parts by weight of halogen impurities per million parts by weight of the total polymer composition. Therefore, the term "halogen-free" as used herein in connection with the finished polymer compositions means that they contain, if any, no more than about 100 ppmw of halogen. Usually they will contain less halogen than this, unless a halogen-containing solvent or a halogen-containing gas is used in preparing the resin produced from a PC/ABS polymer composition of this invention.

Similarly, in preferred embodiments no antimony-containing additive is intentionally added to a composition of this invention. Such preferred compositions are devoid of antimony-containing components except possibly for adventitious trace amounts which possibly may find their way into the polymer blends through contamination of blending equipment by antimony additives such as antimony oxides previously used in such equipment.

A further embodiment of this invention is the method of rendering a thermoplastic PC/ABS polymer flame resistant which comprises incorporating therein the above phosphoramidate flame retardant(s) in an amount such that the resultant polymer composition contains a flame retardant amount of the flame retardants in whatever chemical composition and form such components exist in the resultant polymer composition. As noted above, such polymer composition even when devoid of anti-dripping agent typically will provide test specimens exhibiting at least V-2 rating in the UL-94 test procedure.

It may be possible to incorporate the flame retardants of this invention in the substrate polymer prior to, or during, formation of the polycarbonate or ABS polymer. For example, such components may possibly be added to the monomer(s) or to the polymerization system to be used in forming the polymer. Similarly, it may be possible to add the flame retardants to the polymerization mixture during the course of the polymerization reaction itself. Preferably however, the flame retardants of this invention are added to the thermoplastic polymer after the polymer has been produced. It will also be appreciated that the possibility exists for additions being made in stages, such as prior to and during the polymerization, or prior to and after the polymerization, or during and after the polymerization, or prior to, during and after the polymerization.

Other ingredients such as extrusion aids (e.g., barium stearate or calcium stearate), acid scavengers (e.g., magnesium oxide or tetrasodium pyrophosphate), dyes, pigments, fillers, stabilizers, antioxidants, antistatic agents, reinforcing agents, and the like can be included in the polymer compositions of this invention. One or more anti-dripping agents such as suitable fluoropolymers (e.g., tetrafluoroethylene polymer) are desirably included in the polymer compositions of this invention. The particular materials selected for use in the composition of this invention should not materially affect adversely the properties of the finished polymer composition for its intended utility.

Various known procedures can be used to prepare the blends or formulations constituting the compositions of this invention. For example the components to be incorporated into the finished blend can be blended together in powder form and thereafter molded by extrusion, compression, or injection molding. Likewise the components can be mixed together in a Banbury mixer, a Brabender mixer, a roll mill, a kneader, or other similar mixing device, and then formed into the desired form or configuration such as by extrusion followed by comminution into granules or pellets, or by other known methods.

The compositions of this invention can be utilized in the formation of useful articles of the type normally fabricated by molding or extrusion of conventional flame retarded polymers. Molding and extrusion conditions such as temperatures and pressures are within conventional recommended limits.

The following examples are presented for purposes of illustration, and are not intended to limit the scope of this invention. Examples 1–3 illustrate efficient processes by which the various phosphoramidate flame retardants of this invention can be prepared.

EXAMPLE 1

O,O-diphenyl-N-phenylphosphoramidate

Aniline (251.6 g, 2.7 mol) and 1-L of chloroform were charged into a 2-L round bottom flask equipped with stirrer, nitrogen purge, thermometer, addition funnel and condenser with an oil bubbler. Diphenyl chlorophosphate (362.88 g, 1.35 mol) was placed in the addition funnel and added dropwise to the aniline solution over 45 min. The reaction exothermed to about 50° C. on the addition of the diphenyl chlorophosphate and a white precipitate formed (aniline hydrochloride). The reaction temperature was maintained at 50° C. by the means of a water bath. After the addition was complete the reaction was stirred at room temperature over night. The salt was then filtered off and dissolved in water to yield some product. The chloroform was then stripped from the resulting solution on a Roto-vap to yield a white solid. The solid was stirred in a 2-L of a 5% HCl solution to remove any unreacted aniline. The solid was filtered off and washed two times by stirring in 2-L of water and filtering. The product was recrystallized from 95% ethanol and dried at 60° C. over night in a vacuum oven to yield 370 g (84%) of a white crystalline solid. NMR data (CDCl$_3$) $^{31}$P:s, about –6 ppm; s, 1H: m, 7.2 ppm, Ar—H.

EXAMPLE 2

1,3-Phenylene-N,N'-bis(O,O-diphenylphosphoramidate)

m-Phenylene diamine (78 g, 0.7236 mol) was dissolved in 750 mL of chloroform, to which was added 202 mL (146.45 g, 1.447 mol) of triethylamine. Diphenyl chlorophosphate (211.06 g, 0.78564 mol) was placed in an addition funnel and added slowly to the reaction mixture over a 30 minute period. The temperature exothermed to near 50° C. The temperature was maintained at 50° C. by controlling the diphenyl chlorophosphate addition and the use of a water bath. A white precipitate formed. The reaction was then stirred over night at room temperature. The precipitate was filtered off and stirred in water to remove the triethylamine hydrochloride salt and yield some product. The chloroform was then stripped off and the remaining solid was combined with the product from the salt and washed in 1.5-L of a 5% HCl solution to remove any residual triethylamine and to dissolve the salt. The solid was then filtered and added back to 1.5-L of water with stirring to wash out HCL and remove any salt. This step was repeated a total of two times. The solid was collected by filtration, and air dried on the funnel. The product was recrystallized from 95% ethanol to yield 377 g (91%) of a white crystalline solid with amp of 181° C.

NMR data(DMSO-D6) $^{31}$P:s, approximately −6 ppm; 1H: m, 7.2 ppm, Ar—H, d, 8.75 ppm, N—H.

EXAMPLE 3

Piperazinediyl-N,N'-bis(O,O-diphenylphosphoramidate

Piperazine (107.7 g, 1.25 mol) was dissolved in 600 mL of chloroform, to which was added 350 mL (253 g, 2.5 mol) of triethylamine. Diphenyl chlorophosphate (671.6 g, 2.5 mol) was placed in an addition funnel and added slowly to the reaction mixture over a 30 minute period. The temperature exothermed to near 50° C. The temperature was maintained at 50° C. by controlling the diphenyl chlorophosphate addition and the use of a water bath. A white precipitate formed. The reaction was then stirred over night at room temperature. The precipitate was filtered off and stirred in water to remove the triethylamine hydrochloride salt and yield some product. The chloroform was then stripped off and the remaining solid was combined with the product from the salt and washed in 2.5-L of a 5% HCl solution to remove any residual triethylamine and to dissolve the salt. The solid was then filtered and added back to 2.5-L of water with stirring to wash out HCl and remove any salt. This step was repeated a total of two times. The solid was collected by filtration, and air dried on the funnel. The final product is recrystallized from toluene to yield 618.5 g (93%) of a white crystalline solid mp 180° C. NMR data (DMSO-D6) $^{31}$P:s, approximately −2 ppm; 1H: m, 3.2 ppm, —CH2—, m, 7.1–7.4 ppm, Ar—H.

EXAMPLE 4

PC/ABS (T-85 from Bayer) was blended with O,O-diphenyl-N-phenylphosphoramidate from Example 1 to form a composition of this invention having a phosphorus content of 1.71 wt %. This blend was formed by mixing in the components in a Brabender mixer bowl at a temperature of 200° C. for about 10 minutes at a rotor rate of 40–50 rpm. The formulated resin was then compression molded and cut to bar-shaped test specimens measuring 5×0.5×0.0625 inch for UL-94 tests, and 5×0.5×0.125 inch for Vicat tests. The former specimens were then subjected to the vertical flame test according to the UL-94 procedure, and the latter specimens were then subjected to the Vicat test procedure ASTM D 1525. In the UL-94 tests the specimens, although devoid of an anti-dripping agent such as tetrafluoroethylene polymer, exhibited a V-2 rating with a first ignition time averaging 13.9 seconds and a second ignition time averaging 5.2 seconds. The Vicat rating was 87.7° C.

It is of interest to note that two analogs of the phosphoramidate of Example 1, one such analog being O-phenyl-N,N'-diphenylphosphorodiamidate), PhO(PhNH)$_2$P=O, and the other analog being N,N',N"-phenylphosphorotriamidate, (PhNH)$_3$P=O, which are not of this invention, decomposed on formulating as above with PC/ABS, and turned the resin black.

EXAMPLE 5

Using the same procedure as in Example 4, 1,3-phenylene-N,N'-bis(O,O-diphenylphosphoramidate) from Example 2 was formulated with the T-85 PC/ABS from Bayer and tested at a phosphorus concentration of 1.71 wt % for flame retardancy in the UL-94 test. This composition of the invention, although again devoid of an anti-dripping agent such as tetrafluoroethylene polymer, exhibited a V-2 rating with a first ignition time averaging 13.8 seconds and a second ignition time averaging 6.0 seconds.

EXAMPLE 6

The procedure of Example 5 was repeated except that the flame retardant used was piperazinediyl-N,N'-bis(O,O-diphenylphosphoramidate) from Example 3. Again the phosphorus content of the resultant composition was 1.71 wt % and the composition did not contain an anti-dripping dripping agent. The composition achieved a V-2 rating with a first ignition time averaging 19.5 seconds and a second ignition time averaging 10 seconds.

EXAMPLES 7–11

Five different compositions of this invention were prepared and subjected to an extensive series of tests. These compositions were formed by mixing the components in a Brabender mixer, but in this case the test specimens were formed by injection molding using a Battenfield 100/40K injection molding machine operated using the following temperature profile: 440° F., 460° F., 480° F., and 480° F. (ca. 227° C., ca. 238° C., ca. 249° C., and ca. 249° C., respectively) and a mold temperature of 125° F. (ca. 52° C). Three such compositions were composed of T-85 PC/ABS from Bayer which had been dried for 4 hours at 110° C., and with which were blended 10.5 wt % (Ex. 7), 13.2 wt % (Ex. 8), and 15.8 wt % (Ex. 9) of O,O-diphenyl-N-phenylphosphoramidate, and 0.5–0.6 wt % of polytetrafluoroethylene anti-dripping agent (Teflon 6C; DuPont). The other two samples were composed of T-85 PC/ABS from Bayer with which were blended 11.5 wt % (Ex. 10), and 12.6 wt % (Ex. 11) of piperazinediyl-N,N'-bis(O,O-diphenylphosphoramidate), and 0.5–0.6 wt % of the polytetrafluoroethylene anti-dripping agent. The test used, and results obtained are summarized in the Table.

TABLE

Propererties of Various Compositions of This Invention

|  | Ex. 7 | Ex. 8 | Ex. 9 | Ex. 10 | Ex. 11 |
|---|---|---|---|---|---|
| P content, wt % | 1.0 | 1.25 | 1.5 | 1.25 | 1.42 |
| Melt flow @ 250° C. & 5 kg | 30.12 | 40.39 | 54.97 | 29.36 | 37.05 |
| Notched Izod, ft-lb/in | 1.323 | 1.11 | 0.815 | 1.381 | 1.016 |
| Gardner impact, in-lb/in | 32 | 45 | 33 | 30 | 36 |
| UL-94, 0.125 in | V-0 | V-0 | V-0 | V-0 | V-0 |
| UL-94, 0.062 in | NR | V-1 | V-1 | V-0 | V-0 |
| LOI | 26.5 | 26.9 | 27.2 | 27.3 | 27.2 |
| Flexural modulus, psi | 414,706 | 420,949 | 425,358 | 391,646 | 409,682 |
| Flexural 5% strain, psi | 14,820 | 14,748 | 14,632 | 14,089 | 14,439 |
| Flexural strength, psi | 14967 | 14927 | 14766 | 14420 | 14668 |
| Tensile yield, psi | 8804 | 8558 | 8429 | 8526 | 8550 |
| Tensile strain at Yield, % | 3.8 | 3.8 | 3.6 | 4.4 | 4 |
| Tensile modulus, psi | 415,952 | 411,248 | 410,442 | 390,998 | 394,300 |
| Elongation @ break, % | 38 | 41.4 | 65.8 | 56 | 62.2 |
| Tensile @ break, psi | 6563 | 6449 | 6327 | 6558 | 6672 |

TABLE-continued

Propererties of Various Compositions of This Invention

|  | Ex. 7 | Ex. 8 | Ex. 9 | Ex. 10 | Ex. 11 |
|---|---|---|---|---|---|
| HDT @ 264 psi, ° C. | 77.2 | 71.6 | 66.9 | 81 | 77.7 |
| Vicat, ° C. | 104.5 | 98.8 | 93.1 | 109.7 | 105.6 |

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A flame retardant polymer composition which comprises a blend made from a thermoplastic polycarbonate-ABS resin comprised of from about 50 to about 90 weight percent of a polycarbonate resin and from about 10 to about 50 weight percent of an ABS resin and a flame retardant amount of at least one halogen-free phosphoramidate selected from the group consisting of (I) O,O-diaryl-N-arylphosphoramidates, and (II) arylene-N,N-bis(O,O-diaryl-phosphoramidates) in which the nitrogen atoms are in the 1,3 or 1,4 positions on an arylene ring, wherein said flame retardant amount of said at least one halogen-free phosphoramidate is sufficient to provide test specimens of 0.0625 inch thickness containing said at least one halogen-free phosphoramidate that have a V-2 rating in the UL-94 test procedure with the proviso that said amount is in the range of about 5 to about 30 weight percent based on the combined weight of said resin and said phosphoramidate, and wherein said blend is free of the following flame retardant auxiliary additives: antimony-based synergists, halogen-containing flame retardants, and sulfur or sulfur-containing auxiliaries.

2. A composition according to claim 1 wherein the phosphoramidate used in forming said blend is at least one O,O-diaryl-N-arylphosphoramidate of the formula:

(RO)$_2$P(O)(NHR)

wherein each R is the same or different and is an aryl group containing in the range of 6 to about 18 carbon atoms.

3. A composition according to claim 2 wherein each R is a hydrocarbyl aryl group containing in the range of 6 to about 14 carbon atoms.

4. A composition according to claim 2 wherein each R is a monocyclic aryl group containing in the range of 6 to about 14 carbon atoms.

5. A composition according to claim 4 wherein the phosphoramidate used in forming said blend is O,O-diphenyl-N-phenylphosphoramidate.

6. A composition according to claim 1 wherein the phosphoramidate used in forming said blend is at least one arylene-N,N'-bis(O,O-diarylphosphoramidate) of the formula:

[(RO)$_2$P(O)NH—]$_2$Ar wherein each R is the same or different and is an aryl group containing in the range of 6 to about 18 carbon atoms, and Ar is an 1,3- or 1,4-arylene group so that the nitrogen atoms are in the 1,3 or 1,4 positions of the arylene group.

7. A composition according to claim 6 wherein Ar is a phenylene group and wherein each R is a hydrocarbyl aryl group containing in the range of 6 to about 14 carbon atoms.

8. A composition according to claim 6 wherein Ar is a phenylene group and wherein each R is a monocyclic aryl group containing in the range of 6 to about 14 carbon atoms.

9. A composition according to claim 6 wherein Ar is a 1,3-phenylene group.

10. A composition according to claim 9 wherein the phosphoramidate used in forming said blend is 1,3-phenylene-N,N'-bis(O,O-diphenylphosphoramidate).

11. A composition according to claim 1 wherein said composition is in the form of a melt blended masterbatch or a powder blend.

12. A composition according to claim 1 wherein said composition is in the form of a molded or extruded article or shape.

13. A composition according to claim 1 wherein said flame retardant amount is in the range of about 10 to about 20 weight percent of the total weight of said resin and phosphoramidate in the blend.

14. A molded shape or object made from a composition of claim 2.

15. A molded shape or object made from a composition of claim 5.

16. A molded shape or object made from a composition of claim 6.

17. A molded shape or object made from a composition of claim 10.

18. A composition according to claim 5 wherein said flame retardant amount is in the range of about 10 to about 20 weight percent of the total weight of said resin and said phosphoramidate in the blend.

19. A flame retardant polymer composition produced from a melt blend of ingredients comprising at least (A) a thermoplastic polycarbonate-ABS resin comprised of from about 50 to about 90 weight percent of a polycarbonate resin and from about 10 to about 50 weight percent of an ABS resin, (B) a flame retardant amount of at least one halogen-free O,O-diaryl-N-arylphosphoramidate and (C) an anti-dripping amount of at least one anti-dripping agent, and wherein said flame retardant amount of said at least one halogen-free O,O-diaryl-N-arylphosphoramidate is sufficient to provide test specimens of 0.125 inch thickness containing said at least one halogen-free O,O-diaryl-N-arylphosphoramidate that have a V-0 rating in the UL-94 test procedure with the proviso that said amount is in the range of about 5 to about 30 weight percent based on the combined weight of said resin and said O,O-diaryl-N-arylphosphoramidate, and wherein said blend is free of the following flame retardant auxiliary additives: antimony-based synergists, halogen-containing flame retardants, and sulfur or sulfur-containing auxiliaries.

20. A composition according to claim 19 wherein the anti-dripping agent comprises a polyfluoroolefin polymer.

21. A composition according to claim 20 wherein the polyfluoroolefin polymer is a polytetrafluoroethylene polymer.

22. A composition according to claim 21 wherein the phosphoramidate ingredient used in forming said blend is at least one O,O-diaryl-N-arylphosphoramidate of the formula:

(RO)$_2$P(O)(NHR)

wherein each R is the same or different and is an aryl group containing in the range of 6 to about 18 carbon atoms.

23. A composition according to claim 21 wherein the phosphoramidate ingredient used in forming said blend consists essentially of O,O-diphenyl-N-phenylphosphoramidate.

24. A composition according to claim 23 wherein the phosphoramidate ingredient used in forming said blend consists essentially of O,O-diphenyl-N-phenylphosphoramidate and wherein said flame retardant amount is in the range of about 10 to about 20 weight percent of the total weight of said resin and phosphoramidate in the blend.

25. A composition according to claim 24 wherein said blend exhibits a rating of 93.1 ° C. when subjected to the Vicat test procedure ASTM D 1525.

26. The method of forming a flame retardant polymer composition which comprises blending together ingredients comprising (A) a thermoplastic polycarbonate-ABS resin comprised of from about 50 to about 90 weight percent of a polycarbonate resin and from about 10 to about 50 weight percent of an ABS resin and (13) a flame retardant amount of at least one halogen-free phosphoramidate selected from the group consisting of (I) O,O-diaryl-N-arylphosphoramidates, and (II) arylene-N,N-bis(O,O-diarylphosphoramidates) in which the nitrogen atoms are in the 1,3 or 1,4 positions on an arylene ring, wherein said flame retardant amount of said at least one halogen-free phosphoramidate is sufficient to provide test specimens of 0.0625 inch thickness containing said at least one halogen-free phosphoramidate that have a V-2 rating in the UL94 test procedure with the proviso that said amount is in the range of about 5 to about 30 weight percent based on the combined weight of said resin and said phosphoramidate, and wherein said polymer composition is free of the following flame retardant auxiliary additives: antimony-based synergists, halogen-containing flame retardants, and sulfur or sulfur-containing auxiliaries.

27. The method of claim 26 wherein the phosphoramidate ingredient used in forming said blend consists essentially of O,O-diphenyl-N-phenylphosphoramidate or 1,3-phenylene-N,N'-bis(O,O-diphenylphosphoramidate).

28. The method of claim 26 wherein said ingredients are blended together while (A) is in the form of a molten polymer.

29. The method of claim 26 wherein said ingredients are in the form of powders or granules and are blended together as powders or granules.

30. The method according to claim 26 wherein the phosphoramidate ingredient used in forming said blend consists essentially of 1,3-phenylene-N,N'-bis(O,O-diphenylphosphoramidate).

31. The method according to claim 27 wherein said phosphoramidate ingredient used in forming said blend consists essentially of O,O-diphenyl-N-phenylphosphoramidate, wherein said flame retardant amount is in the range of about 10 to about 20 weight percent of the total weight percent of said resin and phosphoramidate in the blend.

32. A method of forming a flame retardant polymer composition which comprises blending together ingredients comprising (A) a thermoplastic polycarbonate-ABS resin comprised of from about 50 to about 90 weight percent of a polycarbonate resin and from about 10 to about 50 weight percent of an ABS resin, (B) a flame retardant amount of at least one halogen-free O,O-diaryl-N-arylphosphoramidate and (C) an anti-dripping amount of at least one anti-dripping agent, and wherein said flame retardant amount of said at least one halogen-free O,O-diary-N-arylphosphoramidate is sufficient to provide test specimens of 0.125 inch thickness containing said at least one halogen-free O,O-diaryl-N-arylphosphoramidate that have a V-0 rating in the UL-94 test procedure with the proviso that said amount is in the range of about 5 to about 30 weight percent based on the combined weight of said resin and said O,O-diaryl-N-arylphosphoramidate, and wherein said polymer composition is free of the following flame retardant auxiliary additives: antimony-based synergists, halogen-containing flame retardants, and sulfur or sulfur-containing auxiliaries.

33. The method according to claim 32 wherein said anti-dripping agent comprises a polyfluoroolefin polymer.

34. The method according to claim 33 wherein said polyfluoroolefin polymer is a polytetrafluoroethylene polymer.

35. The method according to claim 32 wherein said flame retardant amount is in the range of about 10 to about 20 weight percent of the total weight percent of said resin and phosphoramidate in the blend.

36. The method according to claim 35 wherein said phosphoramidate ingredient used in forming said blend consists essentially of O,O-diphenyl-N-phenylphosphoramidate.

37. In a method of producing a flame retarded molded shape or object, which method comprises molding a molten flame retardant thermoplastic polymer, the improvement which comprises molding a polymer composition made from ingredients comprising (A) a thermoplastic polycarbonate-ABS resin comprised of from about 50 to about 90 weight percent of a polycarbonate resin and from about 10 to about 50 weight percent of an ABS resin, (B) a flame retardant amount of at least one halogen-free 0,0-diaryl-N-arylphosphoramidate, and (C) an anti-dripping amount of at least one anti-dripping agent, and wherein said flame retardant amount of said at least one halogen-free O,O-diaryl-N-arylphosphoramidate is sufficient to provide test specimens of 0.125 inch thickness containing said at least one halogen-free O,O-diaryl-N-arylphosphoramidate that have a V-0 rating in the UL-94 test procedure with the proviso that said amount is in the range of about 5 to about 30 weight percent based on the combined weight of said resin and said O,O-diaryl-N-arylphosphoramidate, and wherein said polymer composition is free of the following flame retardant auxiliary additives: antimony-based synergists, halogen-containing flame retardants, and sulfur or sulfur-containing auxiliaries.

38. The improvement according to claim 37 wherein said anti-dripping agent comprises a polyfluoroolefin polymer.

39. The improvement according to claim 38 wherein said polyfluoroolefin polymer is a polytetrafluoroethylene polymer.

40. The improvement to claim 37 wherein said flame retardant amount is in the range of about 10 to about 20 weight percent of the total weight percent of said resin and O,O-diaryl-N-arylphosphoramidate in the blend.

41. The improvement according to claim 40 wherein said O,O-diaryl-N-arylphosphoramidate ingredient used in forming said blend consists essentially of O,O-diphenyl-N-phenyl-phosphoramidate.

42. In a method of producing a flame retarded molded shape or object, which method comprises molding a molten flame retardant thermoplastic polymer, the improvement which comprises molding a polymer composition made from ingredients comprising (A) a thermoplastic polycarbonate-ABS resin comprised of from about 50 to about 90 weight percent of a polycarbonate resin and from about 10 to about 50 weight percent of an ABS resin and (B) a flame retardant amount of at least one halogen-free phosphoramidate selected from (I) O,O-diaryl-N-arylphosphoramidates, and (II) arylene-N,N'-bis(O,O-diarylphosphoramidates) in which the nitrogen atoms are in the 1,3 or 1,4 positions on an arylene ring, wherein said flame retardant amount of said at least one halogen-free phosphoramidate is sufficient to provide test specimens of 0.0625 inch thickness containing said at least one halogen-free phosphoramidate that have a V-2 rating in the UL-94 test procedure with the proviso that said amount is in the range of about 5 to about 30 weight percent based on the combined weight of said resin and said phosphoramidate, and wherein said polymer composition is free of the following flame retardant auxiliary additives: antimony-based synergists, halogen-containing flame retardants, and sulfur or sulfur-containing auxiliaries.

* * * * *